Figure 1:
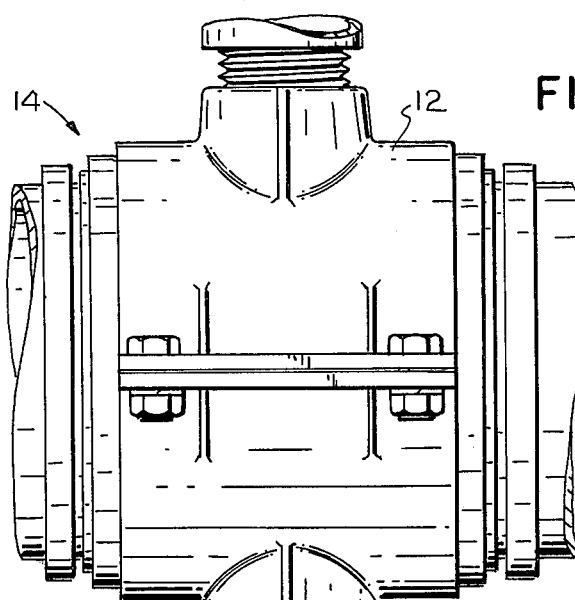

United States Patent [19]

Clements

[11] 3,999,570
[45] Dec. 28, 1976

[54] IRRIGATION DRAIN VALVE

[75] Inventor: Lloyd W. Clements, Woodland, Calif.

[73] Assignee: Ireco Industries, Inc., Eugene, Oreg.

[22] Filed: Feb. 27, 1975

[21] Appl. No.: 553,523

[52] U.S. Cl. .............................. 137/517; 251/145; 251/339

[51] Int. Cl.² ........................................ F16K 15/18

[58] Field of Search .......... 251/145, 146, 339, 322; 137/517; 239/542, 499, 504, 518, 524, 11

[56] References Cited

UNITED STATES PATENTS

| 337,236 | 3/1886 | Briscoe | 137/517 |
|---|---|---|---|
| 2,078,347 | 4/1937 | Shepherd et al. | 137/517 X |
| 3,008,686 | 11/1961 | Becker | 251/339 X |
| 3,143,135 | 8/1964 | Cornelius | 251/145 X |
| 3,702,141 | 11/1972 | Wetterhorn | 137/542 X |
| 3,820,565 | 6/1974 | Durbin | 137/517 X |
| 3,919,991 | 11/1975 | Neschke et al. | 137/517 X |

*Primary Examiner*—William R. Cline
*Attorney, Agent, or Firm*—Klarquist, Sparkman, Campbell, Leigh, Hall & Whinston

[57] ABSTRACT

A valve body has a large threaded inlet portion adapted to be screwed into an irrigation coupling, and also has a large inlet, a tapered portion leading from the inlet to a smaller outlet portion with an O-ring seal in a groove in the tapered portion and a cup at the end of the outlet portion to turbulate the water. A valve closure member has a tapered head and a stem, slidable in the body, and a spring urges the head away from the O-ring seal. A nut on the stem limits movement of the valve closure member by the spring.

2 Claims, 2 Drawing Figures

U.S. Patent  Dec. 28, 1976  3,999,570

IRRIGATION DRAIN VALVE

DESCRIPTION

This invention relates to an irrigation drain valve, and has for an object thereof the provision of a new and improved irrigation drain valve.

Another object of the invention is to provide an irrigation drain valve having only a very few parts.

Another object of the invention is to provide an irrigation drain valve which dissipates force of water being drained before discharging the water therefrom.

A further object of the invention is to provide an irrigation drain valve which is adapted to be molded or cast.

Figure 2:
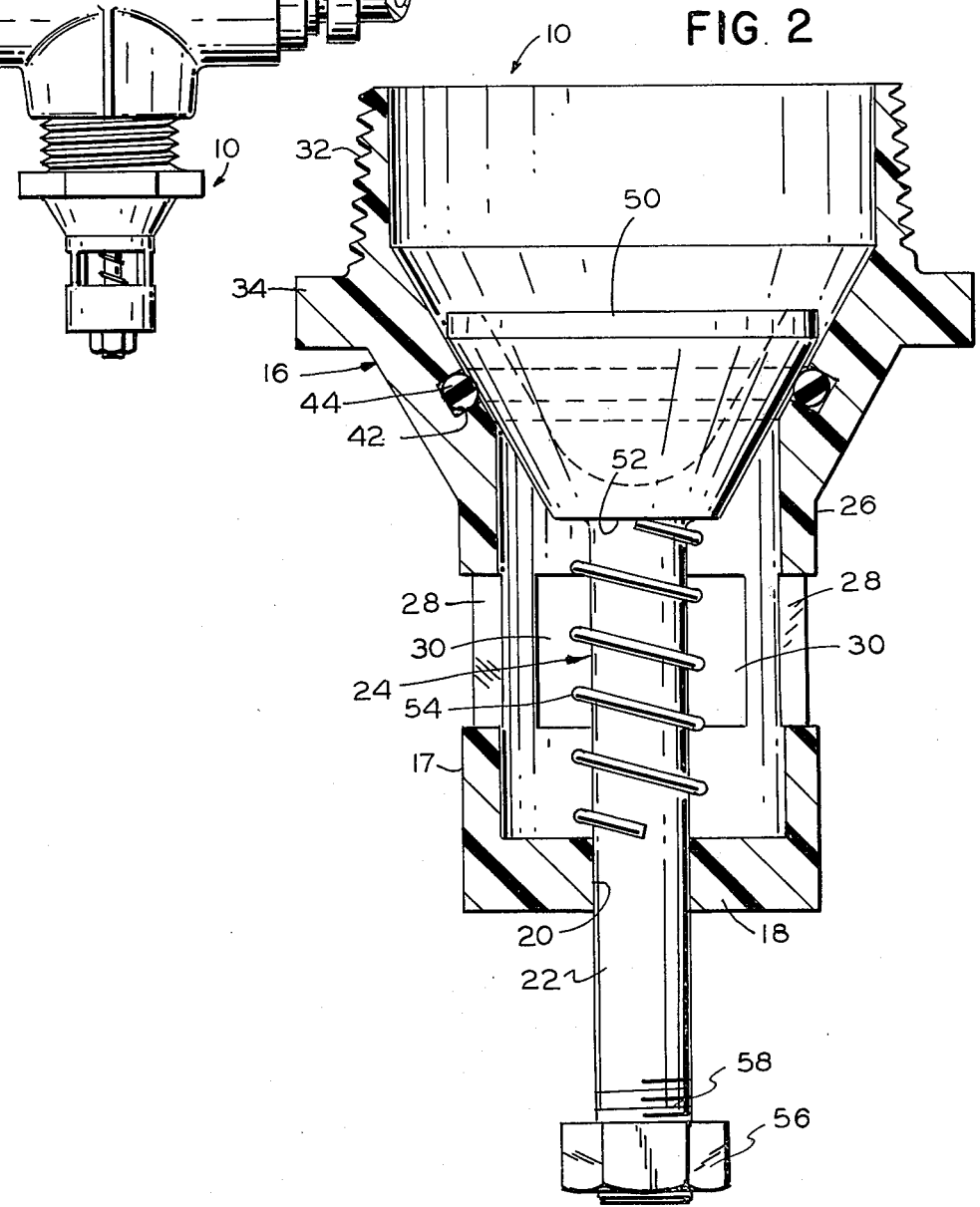

In the drawings:

FIG. 1 is a fragmentary side elevation view of an irrigation pipe coupling and an improved irrigation drain valve forming one embodiment of the invention; and, FIG. 2 is an enlarged vertical sectional view of the valve of FIG. 1.

Referring now in detail to the drawings, there is shown therein an improved irrigation drain valve 10 forming one embodiment of the invention and screwed into the bottom portion of a rotary coupling 12 of a rotatable irrigation line 14. The valve includes a body 16 having lower, cup portion 17 having a closed bottom 18 with a central guide bore 20 for a rod portion 22 of a valve closure member or piston 24. The body also has a cylindrical sleeve portion 26 of the same internal diameter as the cup and connected to the cup by post portions 28 which form discharge ports 30. An externally threaded upper portion 32 may be screwed into or out of the coupling by a hexagonal, wrench receiving, drive portion 34.

The internal diameter of the upper portion 32 of the body 16 is substantially greater than that of the sleeve portion 26 and the cup portion 17, and a frustoconical portion 40 joins the upper portion 32 and the sleeve portion 26. An annular, valve seat groove 42 is formed in the frusto-conical portion, and receives part of an O-ring 44 which forms a valve seat.

The valve closure member 24 has a cupped, frustoconical head 50 having a spring seating shoulder 52 at its lower end. A spring 54 on the stem 22 urges the valve closure member upwardly toward a normal, open position. A nut 56 on threaded portion 58 of the valve stem limits upward movement of the valve closure member.

OPERATION

When water under pressure is supplied to the line 14, the pressure on the head 50 of the valve member 24 with the venturi effect under the head, pushes the member 24 down until the head seats sealingly on the O-ring 44 to stop flow of water through the valve, the closed position being shown in FIG. 2. Then, when the supply of water under pressure to the line 16 is stopped, the pressure of the water in the line drops, and the spring 54 pushes the valve member to its open position. The water in the line then flows downwardly through the valve body and into the cup portion 17, which turbulates the water to dissipate much of its force, and then flows out of the valve through the ports 30.

The energy dissipation by the cup portion 17 breaks up stream flow to minimize soil erosion and crop damage. The valve member 24 initially tends to oscillate as the pressure builds up, and the cone shape of the head and the joining portion 40 provides full opening to pass debris, helps prevent clogging of the valve and provides fast draining. The cone shape of the head also provides a very positive sealing against the resilient O-ring. The valve has minimum maintenance, and also may be used as a surge-vacuum valve, a check valve or an air-relief valve.

What is claimed is:

1. In an improved irrigation drain valve,
    a tubular valve body having an upper, externally threaded inlet portion and a cylindrical inlet passage portion of a first predetermined diameter,
    the valve body also having a lower, elongated, cup-like outlet portion having a cylindrical outlet passage portion aligned with the inlet passage and of a second diameter substantially smaller than that of the inlet passage portion,
    the outlet portion being closed at the end thereof more remote from the inlet portion and having a bore through said end,
    the bore being axially aligned with the passage portions and being substantially smaller in diameter than said second diameter,
    the valve body also having a frustoconical valve seat portion connecting the outlet portion to the inlet portion,
    the outlet portion having laterally extending drain holes spaced substantially upwardly from said end of the outlet portion,
    a valve closure member including a frustoconical head adapted to engage the valve seat portion and a cylindrical stem extending along the outlet passage portion and being substantially smaller in diameter than the outlet passage portion,
    the portion of the stem and the outlet passage portion below the drain holes forming a turbulating area adapted to decrease force of water being discharged,
    said stem extending through said bore and including a threaded portion extending beyond the body, and including a nut screwed onto the threaded portion,
    spring means mounted on the stem and engaging the head and the bottom of the cup-like end portion and urging the head upwardly away from the valve seat portion,
    and an O-ring seal means positioned between the valve closure member and the frustoconical valve seat portion of the body member.

2. The valve of claim 1 wherein the valve body includes an annular groove in the frustoconical portion thereof, and said O-ring seal means being seated in the annular groove.

* * * * *